United States Patent [19]

Zankl

[11] 4,164,290
[45] Aug. 14, 1979

[54] AUTOMATIC TOOL CHANGER FOR MACHINE TOOLS

[75] Inventor: Frank Zankl, Milwaukee, Wis.

[73] Assignee: Kearney & Trecker Corporation, West Allis, Wis.

[21] Appl. No.: 833,508

[22] Filed: Sep. 15, 1977

[51] Int. Cl.² ............................................... B65G 47/90
[52] U.S. Cl. ..................................... 414/739; 29/568; 198/803; 414/732
[58] Field of Search ............... 29/568; 214/1 B, 1 BS, 214/1 R, 1 BC, 1 BH, 1 BV, 1 BD, 147 T; 198/645, 646, 803, 859, 344

[56] References Cited

U.S. PATENT DOCUMENTS

| | | | |
|---|---|---|---|
| 3,281,935 | 11/1966 | Zankl et al. | 29/568 |
| 3,451,125 | 6/1969 | Lehmkuhl | 29/568 |
| 3,456,813 | 7/1969 | Grainger et al. | 214/1 Q |
| 3,647,043 | 3/1972 | Garetto | 198/803 X |
| 3,886,652 | 6/1975 | Roubloff et al. | 214/1 BD X |

*Primary Examiner*—Frank E. Werner

*Attorney, Agent, or Firm*—Cyril M. Hajewski; Donald J. Piggott

[57] ABSTRACT

A tool changer drum is rotatably mounted on a machine tool for rotation about an axis which is perpendicular to the spindle axis thereof. A plurality of tool changer arms are swingably mounted on the tool changer drum for swinging movement along radii of the drum between a storage position parallel to the central plane of the drum and a transfer position perpendicular to the central plane of the drum. A pneumatic cylinder is used to index the tool changer drum to place any selected tool changer arm in the ready position. Another pneumatic cylinder is used to swing the ready tool changer arm from its storage position to its transfer position to transfer a toolholder from storage to the spindle and later to swing the tool changer arm back to the storage position to return the toolholder to storage. Before the tool transfer operation, the spindle is moved to a tool transfer position in which the swinging movement of the tool changer arm either places a toolholder in the spindle or removes a toolholder therefrom.

13 Claims, 14 Drawing Figures

AUTOMATIC TOOL CHANGER FOR MACHINE TOOLS

BACKGROUND OF THE INVENTION

This invention relates to automatic tool changers for machine tools which have rotatable spindles that are adapted to receive toolholders and to clamp the toolholders therein. In the past, many different types of automatic tool changers have been devised for such machine tools but they have been relatively complex and expensive and have been powered by electric or hydraulic drive means. Hydraulic units often leak and create housekeeping problems and also are noisemakers. Due to their complexity, these prior art tool changers have also been subject to a relatively high degree of malfunctions.

The principal object of this invention is to provide a tool changer which is simple in construction, low in cost, and able to perform the tool change operation without the use of hydraulic power or electric motors.

Other objects and advantages of the invention will be apparent from the detailed description herein.

SUMMARY OF THE INVENTION

A tool changer drum is rotatably mounted on a frame for rotation about an axis which is transverse to the spindle axis of a machine tool. A plurality of tool changer arms are swingably mounted on the tool changer drum for swinging movement along radii of the drum between a storage position parallel to the central plane of the drum and a transfer position perpendicular to the central plane of the drum. Means is provided on the end of each tool changer arm for receiving a toolholder and for clamping the toolholder thereto. Means is provided for rotatably indexing the tool drum to place a predetermined one of the tool changer arms in a ready position to be swung into tool transfer engagement with the spindle. Means is also provided for swinging the tool changer arm in the ready position from its storage position to its transfer position and from its transfer position to its storage position to transfer a toolholder from storage to the spindle and from the spindle back to storage.

DESCRIPTION OF THE DRAWINGS

FIGS. 1 through 6 show the exterior appearance of one preferred embodiment of the invention mounted on a vertical machining center 10 for interaction therewith. Machining center 10 includes a bed 11, an upright 12 which is slidably mounted on bed 11 on horizontal ways 14, a head 16 which is slidably mounted on upright 12 on vertical ways 18, a spindle 20 which is rotatably mounted on head 16, a saddle 22 which is slidably mounted on bed 11 on horizontal ways 24, along with the various motors, transmissions, and electrical control means (not shown) for effecting operation of the above noted parts. Spindle 20 is adapted to receive conventional toolholders 26 carrying tools 28 and to clamp toolholders 26 in spindle 20 for performing work on a workpiece (not shown) supported on saddle 22 by conventional means (not shown). Spindle 20 is rotatable about a vertical Z axis 30 and can be moved up and down with head 16 along Z axis 30 and from side to side with upright 12 along an X axis 32 which is perpendicular to Z axis 30. Saddle 22 is movable along a Y axis 25 (FIG. 2) which is perpendicular to both X axis 32 and Z axis 30.

Figure 9:
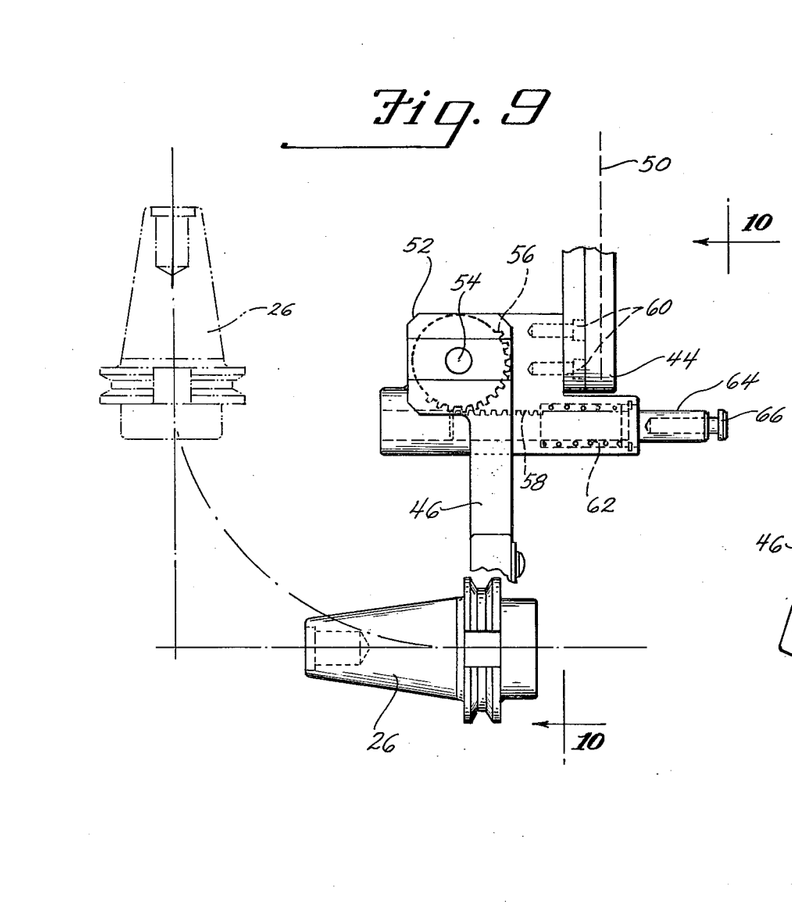
FIG. 9 is a fragmentary front elevational view of a tool changer arm.
Figure 10:
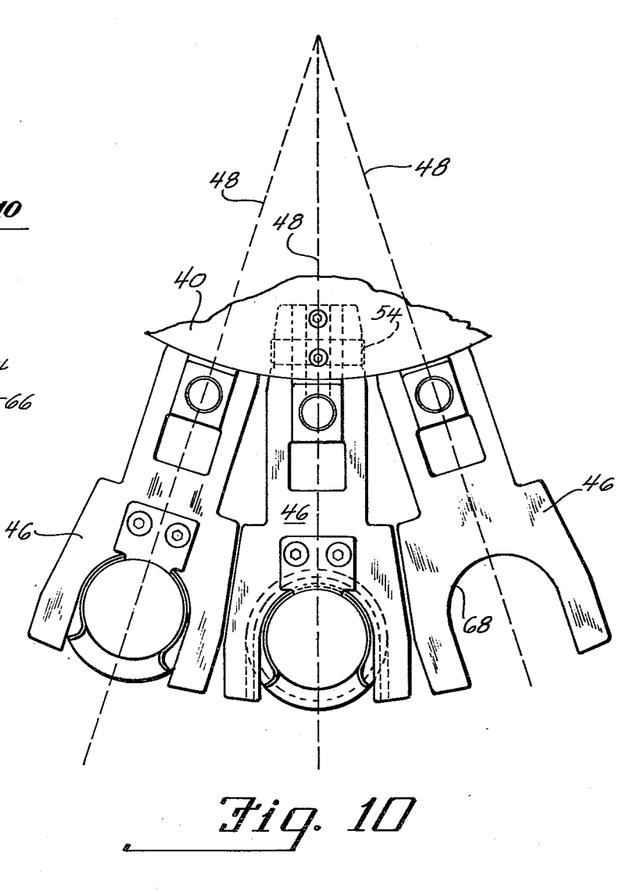
FIG. 10 is a fragmentary right side elevational view taken on the line 10—10 of FIG. 9.

The tool changer includes a frame 34 which is bolted to one end of bed 11 and extends vertically parallel to upright 12. Frame 34 has a base portion 36 (FIG. 2) which is shaped to be attached to bed 11 and has an arm portion 38 (FIG. 2) which extends from base portion 36 opposite spindle 20 and which supports the movable parts of the tool changer. A tool changer drum 40 (FIGS. 7 and 8) is journalled to frame arm 38 for rotation about a horizontal axis 42 which is perpendicular to Z axis 30 (see FIG. 1). Tool changer drum 40 is circular in shape and has a ring gear 44 (FIG. 7) attached to its periphery for driving purposes as explained in later paragraphs. As best shown in FIGS. 9 and 10, tool changer drum 40 has a plurality of tool changer arms 46 which are swingably attached to the periphery of tool changer drum 40 for swinging movement along radii 48 (FIG. 10) thereof between a storage position parallel to the central plane 50 (FIG. 9) of tool changer drum 40, as shown in solid lines in FIG. 9, and a transfer position perpendicular to central plane 50, as shown in broken lines in FIG. 9. Each tool changer arm 46 is swingably mounted within a housing 52 (FIG. 9) by a pin 54 and has a pinion gear 56 which engages a rack 58 that is slidably mounted in housing 52. Housing 52 is rigidly attached to tool changer drum 40 by bolts 60.

Rack 58 is spring loaded to the right in FIG. 9 by a spring 62 and has a plunger 64 extending therefrom for pushing rack 58 to the left in FIG. 9. Plunger 64 has an adjustment screw 66 in its end for controlling the terminal position of tool changer arm 46.

Each of the tool changer arms 46 is similarly mounted on tool changer drum 40 and is equipped with a pinion gear 56, rack 58, and plunger 64 for swinging the arm 46 between its storage and transfer positions.

Figures 11, 12:
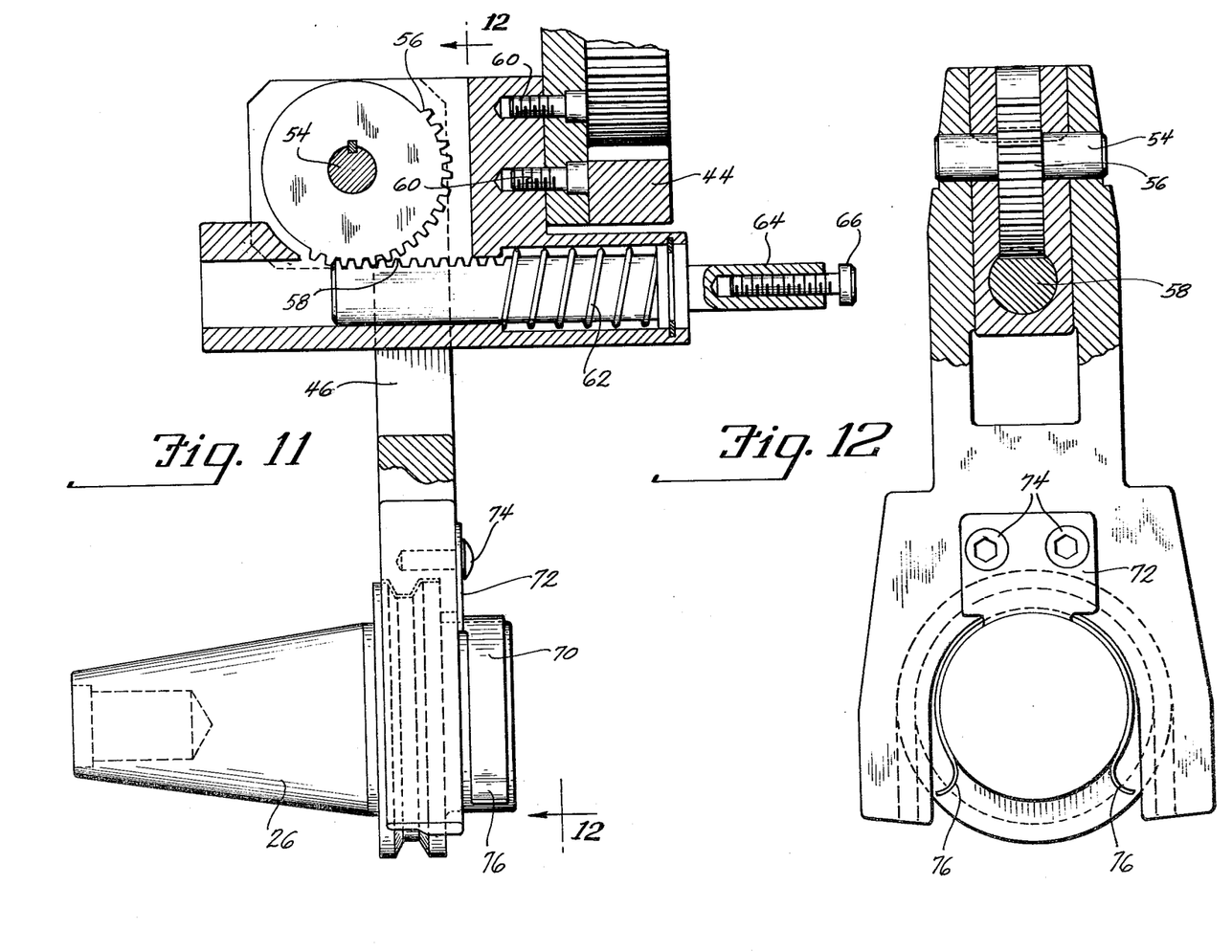
FIG. 11 is a fragmentary front elevational view of the outer end of a tool changer arm showing the tool changer clamp thereon.
FIG. 12 is a fragmentary side elevational view taken on the line 12—12 of FIG. 11.

The outer end of each tool changer arm 46 has a semicircular fork 68 (FIG. 10) formed therein and has a semicircular clamp 70 attached thereto for clamping a toolholder 26 therein. The details of clamp 70 are shown most clearly in FIGS. 11 and 12. Each clamp has a base plate 72 which is attached to the end of tool changer arm 46 by machine screws 74. The forked end of each clamp 70 is curved back at ends 76 (FIG. 12) so that a toolholder 26 can be snapped therein. Clamps 70 are made of spring steel and are strong enough to hold a toolholder 26 and the tool therein against the force of gravity so that they will not drop out of clamp 70, but rather, have to be pulled out.

Figure 7:
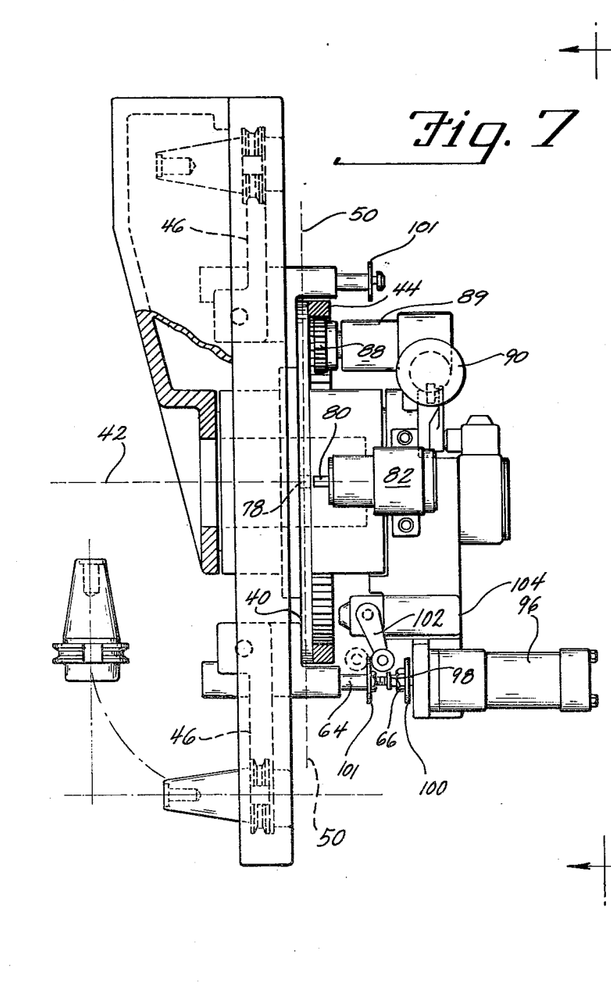
FIG. 7 is a fragmentary front elevational view of the tool changer drum.
Figure 8:
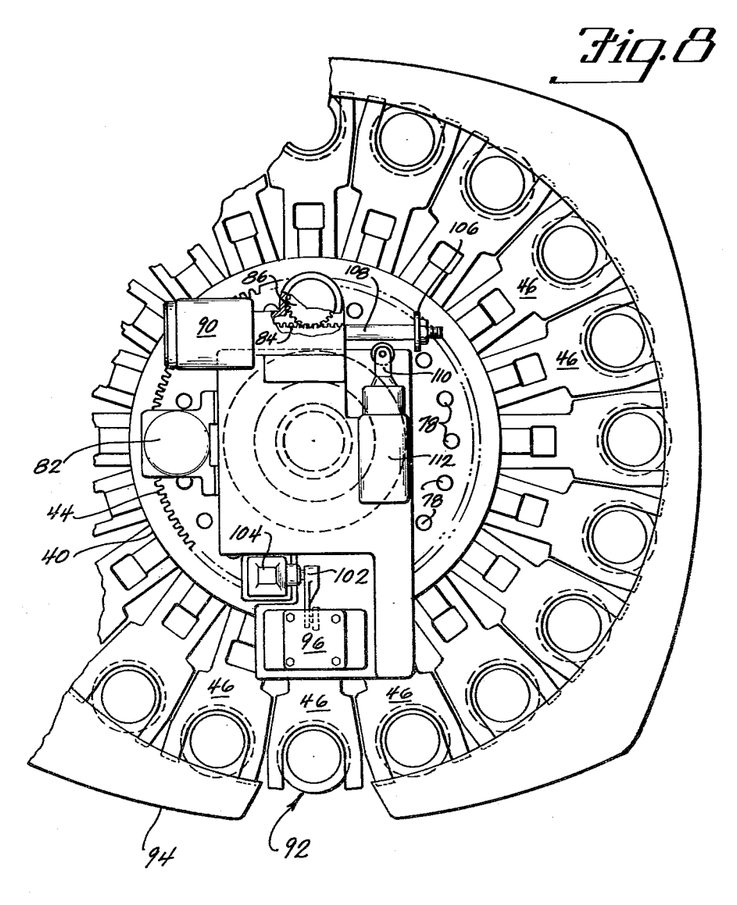
FIG. 8 is a fragmentary right side elevational view of the tool changer drum taken on the line 8—8 of FIG. 7.

As best shown in FIGS. 7 and 8, a plurality of index holes 78 are formed in a circle on tool changer drum 40 and interact with an index pin 80 (FIG. 7) which is driven by a pneumatic cylinder 82. Index pin 80 is normally engaged in one of the index holes 78. In order to index tool changer drum 40, pneumatic cylinder 82 is retracted to release index pin 80 from the corresponding index hole 78 and is held away from tool changer drum 40 while it is being indexed. At the end of the indexing, index pin 80 is extended to enter the new index hole 78 that is aligned therewith.

Tool changer drum 40 is indexed by a rack 84 (FIG. 8) which drives a pinion 86. Pinion 86 is coupled to another pinion 88 (FIG. 7) through an overrunning clutch 89. Pinion 88 engages ring gear 44 and thus rotates tool changer drum 40 when rack 84 is moved to the right in FIG. 8. Rack 84 is moved to the right in FIG. 8 by a pneumatic cylinder 90. When pneumatic cylinder 90 is extended, it causes tool changer drum 40 to rotate through an arc equal to the angle between adjacent tool changer arms 46. When pneumatic cylinder 90 is retracted, there is no movement of tool changer drum 40 due to the action of overrunning clutch 89 coupled between pinion 86 and pinion 88. Each extension of pneumatic cylinder 90 advances tool changer drum 40 by one tool changer arm 46 until the desired tool changer arm 46 is in the ready position, which is defined by an opening 92 (FIG. 8) in a housing 94 which surrounds the outer ends of tool changer arms 46.

The tool changer arm 46 which is in the ready position is rotated upwardly through a 90° arc by a pneumatic cylinder 96 (FIG. 7) which has a plunger 98 that bears against the end of adjustment screw 66 and depresses plunger 64, which causes rotation of arm 46 as described previously through rack 58 (FIG. 9) and pinion 56. Plunger 98 has a flange 100 which engages the actuating arm 102 of a limit switch housing 104 to indicate whether tool changer arm 46 is in its storage position parallel to the central plane 50 of tool changer drum 40 or in its transfer position perpendicular to plane 50. A flange 101 on plunger 64 cooperates with flange 100. Switch housing 104 contains two switches, one of which is closed when tool changer arm 46 is in its transfer position and the other which is closed when tool changer arm 46 is in its storage position. Both switches open when actuating arm 102 passes through its neutral position as tool changer arm 46 moves from one position to the other.

A flange 106 (FIG. 8) is mounted on a plunger 108 of rack 84 to engage an actuating arm 110 of a limit switch 112 which indicates whether rack 84 is in its extended or retracted position.

Figure 1:
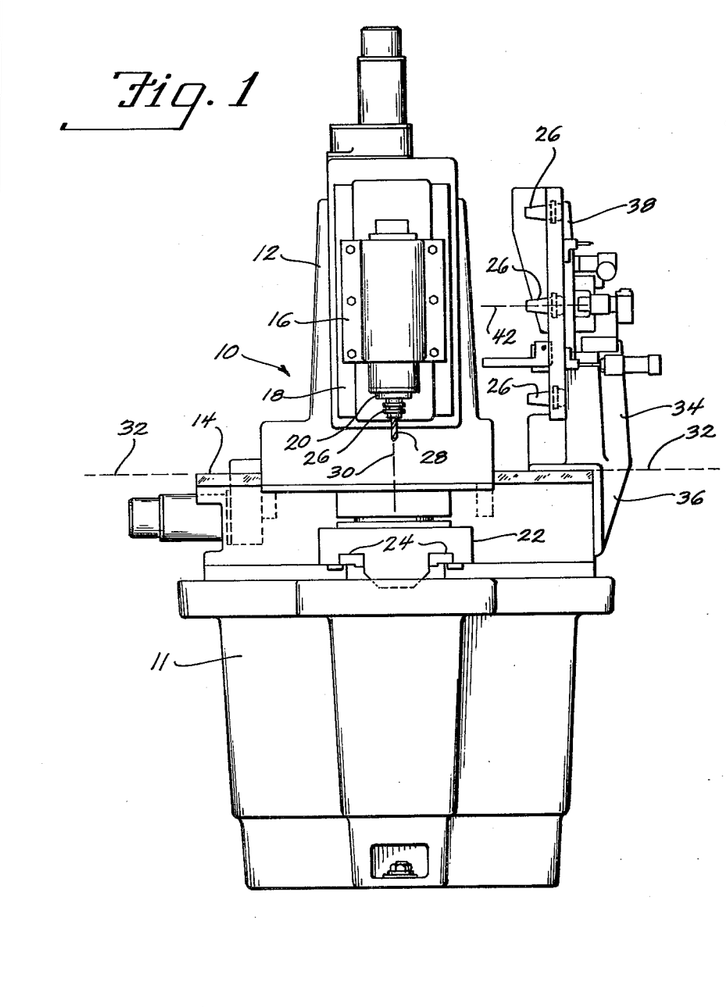
FIG. 1 is a front elevational view of one preferred embodiment of the invention mounted on a vertical machining center.
Figure 2:
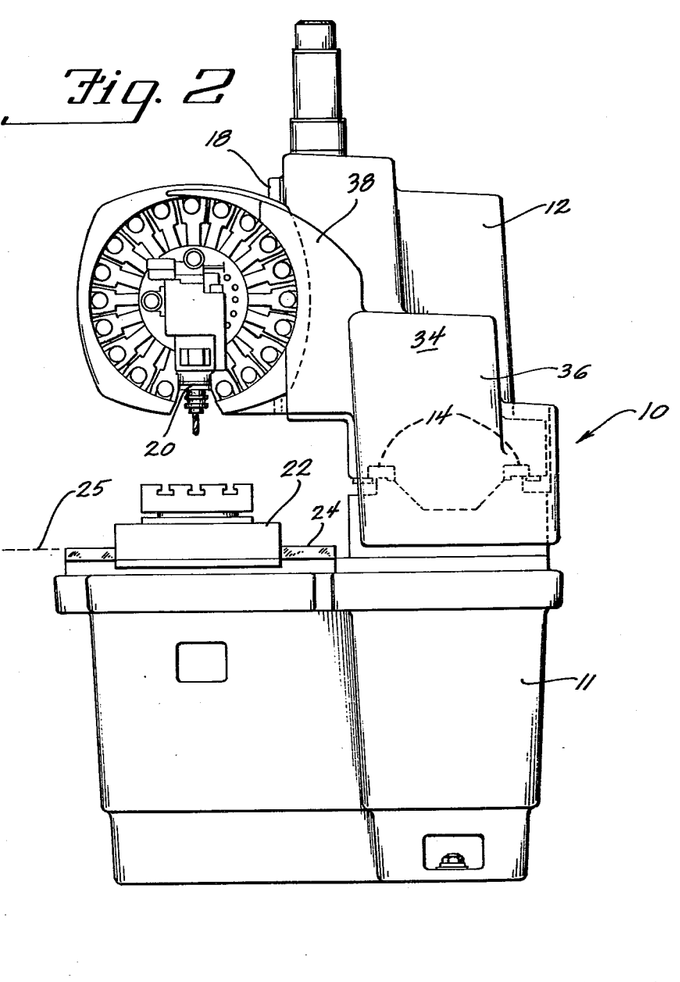
FIG. 2 is a left side elevational view of the embodiment of FIG. 1.
Figure 3:
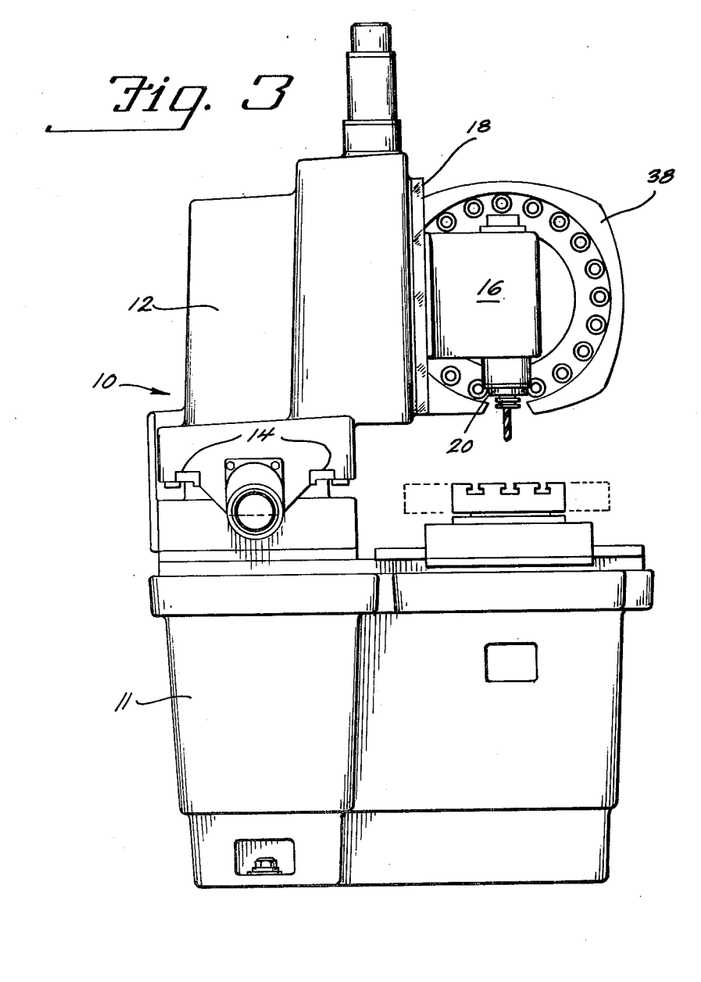
FIG. 3 is a right side elevational view of the embodiment of FIG. 1.
Figure 4:
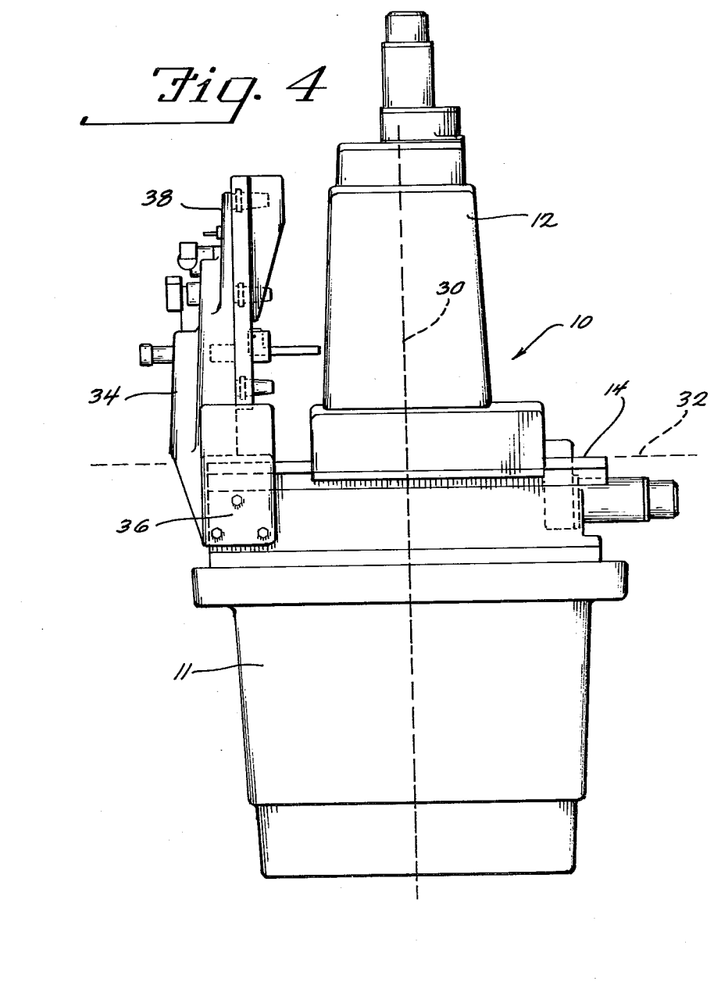
FIG. 4 is a rear elevational view of the embodiment of FIG. 1.
Figure 5:
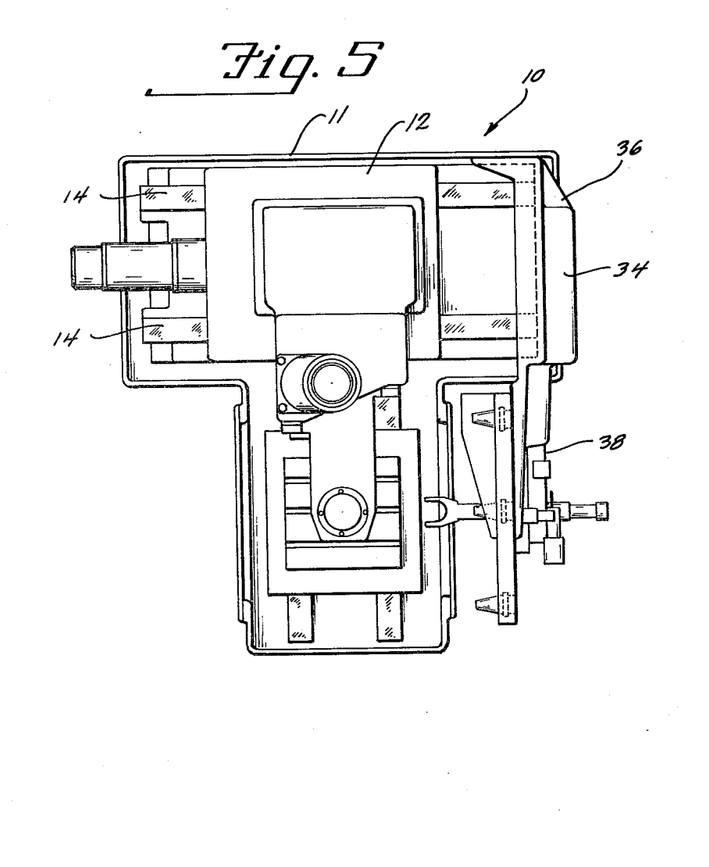
FIG. 5 is a plan view of the embodiment of FIG. 1.
Figure 6:
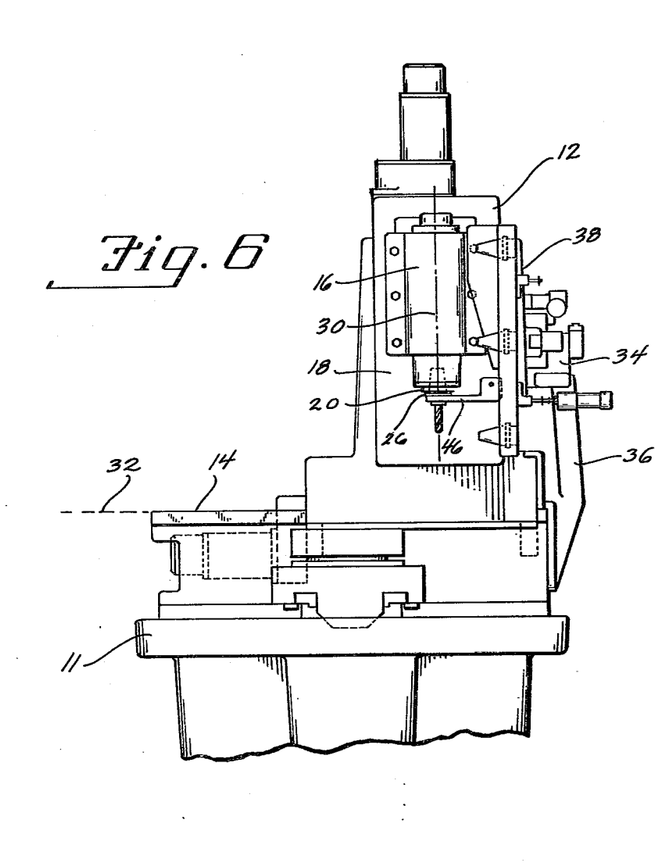
FIG. 6 is a front elevational view of the embodiment of FIG. 1 with the upright in tool transfer position.

To place a tool into spindle 20, upright 12 and head 16 are first moved to the tool transfer position shown in FIG. 6 where spindle 20 is positioned to receive a toolholder 26 carried by tool changer arm 46 when it is swung up into the tool transfer position shown in FIG. 6. Next, pneumatic cylinder 90 is extended and retracted as many times as necessary to index tool changer drum 40 to place the desired tool changer arm 46 in the ready position. Each stroke of pneumatic cylinder 90 indexes tool changer drum 40 through an arc equal to the space between adjacent took changer arms 46. Pneumatic cylinder 82 is retracted before each stroke of cylinder 90 to disengage alignment pin 80 from alignment hole 78 and is then extended after the stroke to re-engage pin 80 in hole 78. When the desired tool changer arm 46 is in the ready position, pneumatic cylinder 96 is extended to swing the selected tool changer arm from its storage to its transfer position as shown in FIG. 6. This places the selected toolholder 26 in the toolholder socket of spindle 20. The toolholder clamp in spindle 20 is then actuated to clamp the selected toolholder 26 therein. Upright 12 and head 16 are then moved away from tool changer arm 46 (to the left in FIG. 6) to pull toolholder 26 out of toolholder clamp 70 on tool changer arm 46. The tool in toolholder 26 is then utilized in a machining operation. During the machining operation, tool changer arm 46 remains in its transfer position shown in FIG. 6.

After the machining operation is completed and a different tool is required in spindle 20, upright 12 and head 16 are moved back to the tool transfer position shown in FIG. 6. As they reach the tool transfer position, the movement of upright 12 and head 16 causes toolholder 26 to snap into toolholder clamp 70 on tool changer arm 46. The toolholder clamp is spindle 20 is then released and pneumatic cylinder 96 is returned to its retracted position to swing tool changer arm 46 and toolholder 26 back to the storage position. Pneumatic cylinders 90 and 82 are then actuated as many times as necessary to index tool changer drum 40 to place the next selected toolholder 26 in the ready position. The selected toolholder 26 is then transferred into spindle 20 as described above and the machining cycle is repeated.

Figure 13:
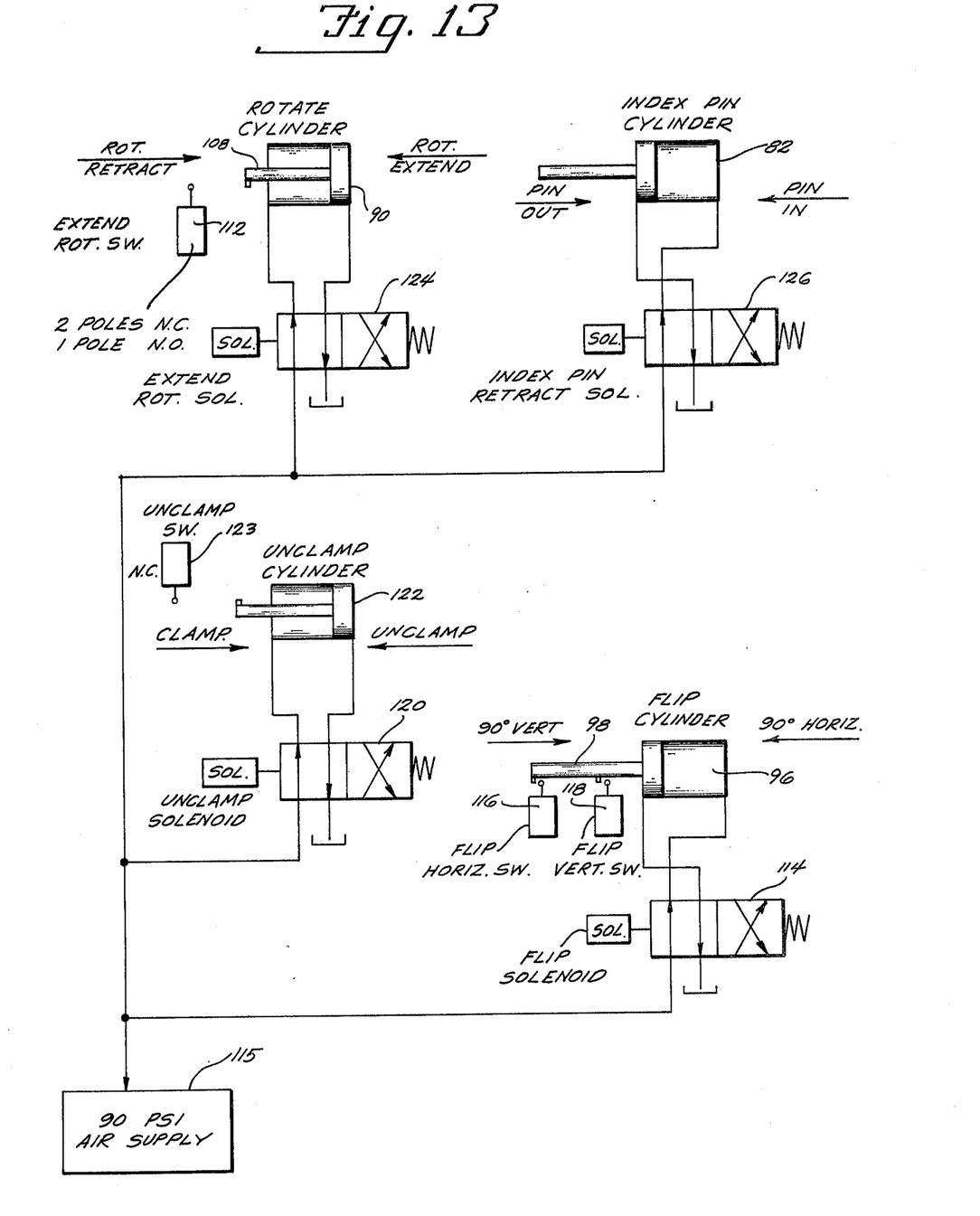
FIG. 13 is a schematic circuit diagram of the pneumatic circuit for operating the tool changer.

FIG. 13 shows the pneumatic circuit for the above described embodiment. A solenoid valve 114 applies compressed air from a compressed air supply 115 to flip cylinder 96 which actuates either flip horizontal switch 116 or flip vertical switch 118 depending on whether cylinder 96 is extended or retracted. Cylinder 96 is normally extended to place tool changer arm 46 in the horizontal transfer position and is retracted when solenoid valve 114 is energized to place tool changer arm 46 in the vertical storage position.

A second solenoid valve 120 applies compressed air to an unclamp cylinder 122 on spindle 20 which controls the toolholder clamp thereon. Cylinder 122 is normally retracted to clamp the toolholder clamp and is extended to unclamp the toolholder clamp when solenoid valve 120 is energized. When cylinder 122 is extended it operates unclamp switch 123.

A third solenoid valve 124 applies compressed air to rotate cylinder 90 which indexes tool changer drum 40. Cylinder 90 is normally in its retracted position but is moved to its extended position when solenoid valve 124 is energized. Extension of cylinder 90 indexes tool changer drum 40 by one increment and actuates extend rotate switch 112. When solenoid valve 124 is de-energized, it causes cylinder 90 to retract, which does not produce any movement of tool changer drum 40 due to the overrunning clutch coupled between cylinder 90 and drum 40.

A fourth solenoid valve 126 applies compressed air to index pin cylinder 82 which is normally extended to place pin 80 in a hole 78 and which is retracted to disengage pin 80 when solenoid valve 126 is energized.

Figure 14:
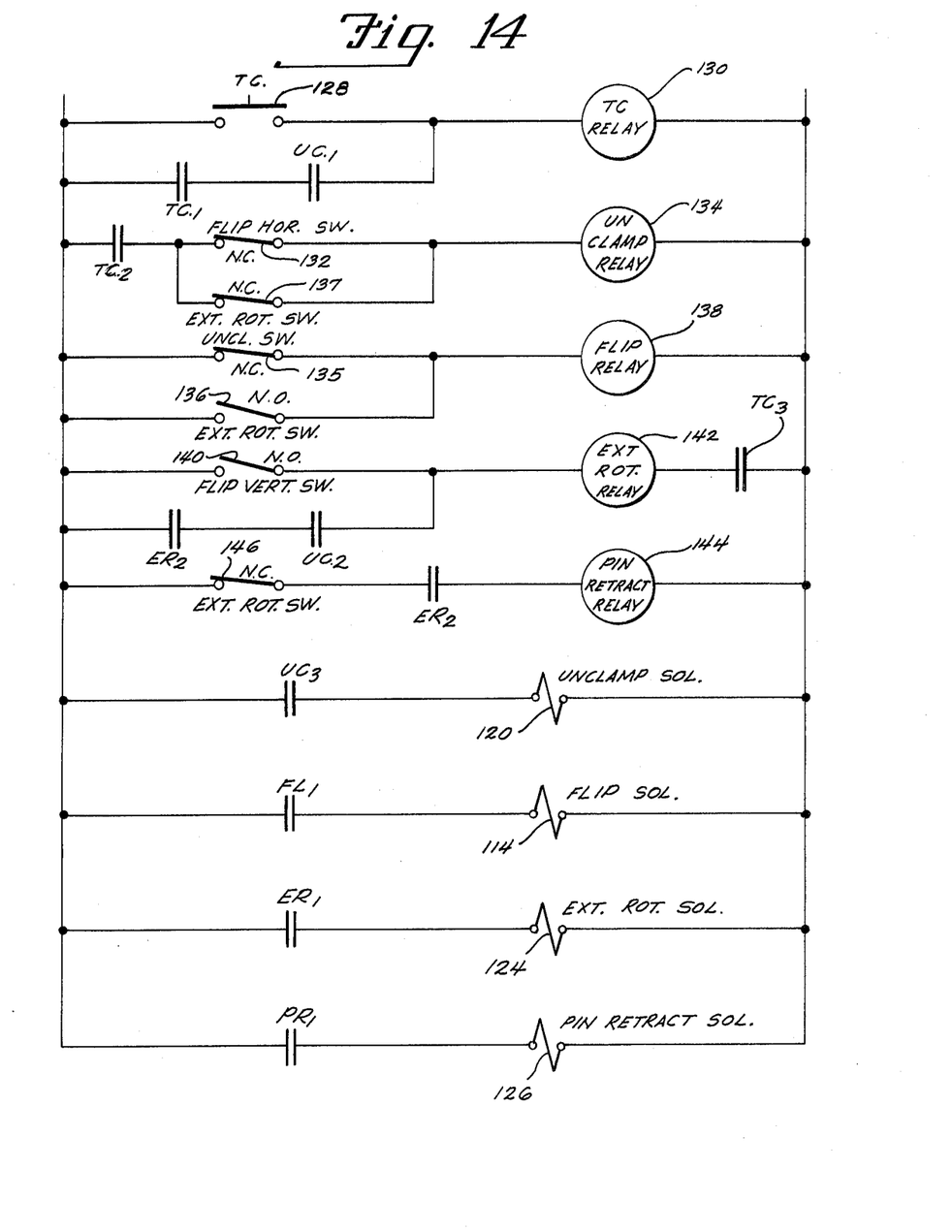
FIG. 14 is a schematic circuit diagram of the electrical circuit which operates the pneumatic circuit of FIG. 13.

The electrical controls for the above-described pneumatic circuit are shown in FIG. 14. The electrical circuit will be described in connection with one complete tool change cycle starting from the condition where spindle 20 is in the tool transfer position and has a tool therein and the corresponding tool changer arm 46 is in the horizontal transfer position. First the tool change (TC) push button switch 128 is momentarily depressed and released. This energizes the tool change relay 130 and closes contacts $TC_1$, $TC_2$ and $TC_3$. At this time the flip horizontal switch contacts 132 are closed so that closure of contacts $TC_2$ energizes unclamp relay 134 which closes contacts $UC_1$, $UC_2$ and $UC_3$. Contacts $UC_1$ latches TC relay 130 in the energized state. Contacts $UC_3$ energizes the unclamp solenoid 120 which unclamp the toolholder clamp in spindle 20 and also opens unclamp switch 135. The extended rotation switch 136 has been open. Flip relay 138 is now de-energized causing the flip solenoid 114 to be de-energized. This causes flip cylinder 96 to drop to the vertical storage position carrying the toolholder 26 with it and also closing the flip vertical switch 140.

Closing the flip vertical switch 140 energizes the extended rotation relay 142 which, in turn, closes contacts $ER_1$ and energizes extended rotation to solenoid 124. Contacts $ER_2$ also close and energize pin retract relay 144 which closes contacts $PR_1$ and energizes the pin retract solenoid 126. Index pin 80 which has been in an index hole 78 is now pulled out. The extended rotation solenoid 124 causes the rotate cylinder 90 to extend and index tool changer drum 40 the angular distance of one tool, which in this example is 18 degrees. When the piston of extended rotation cylinder 90 reaches the end of its stroke it causes the extended rotation switch 146 to open and extended rotation switch 136 to close. This de-energizes pin retract 144 which, in turn, de-energizes pin retract solenoid 126. Index pin 80 then engages the next index hole 78. Closing of extended rotation switch 136 causes flip relay 138 to be energized which energizes flip solenoid 114 and causes the tool changer arm 46 which is in the ready position to be swung upward to the transfer position to insert its toolholder 26 into spindle 20. As tool changer arm 46 reaches the horizontal transfer position it opens the normally closed flip horizontal switch 132. This de-energizes the unclamp 134 which, in turn, de-energizes the unclamp solenoid 120 and clamps the new toolholder 26 in spindle 20. De-energizing unclamp relay 134 also de-energizes the extended rotation relay 142 and also de-energizes the tool change relay 130. This now de-energizes the extended rotation solenoid 124 and permits the piston of rotate cylinder 90 to move back to its retracted position. However, there is no rotation of tool changer drum 40 when the piston of rotate cylinder 90 moves back to the retracted position because of the overrunning clutch 89 in the rotator assembly. Also, the movement of the piston or rotate cylinder 90 back to the retracted position moves the flange 106 off the actuator arm 110 and allows normally closed switch 137 to close, which prepares the circuit for the next tool change.

Although a manual pushbutton 128 is shown for energizing tool change relay 130, it should be understood that an electrical signal from an automatic controller circuit could also be used. Also, although the above-described electrical circuit only indexes tool changer drum 40 by one increment, it can be easily modified to index tool changer drum 40 by any desired number of increments.

Although the illustrative embodiments of the invention have been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention now having been fully explained in connection with the foregoing, I hereby claim as my invention:

1. A tool changer for a machine tool having:
   a bed;
   an upright slidably mounted on said bed for movement along a horizontal axis;
   a head slidably mounted on said upright for movement along a vertical axis;
   a spindle rotatably mounted in said head for rotation about said vertical axis, said spindle being adapted to receive a tool for performing a work operation, said tool changer comprising:
   a frame rigidly attached to said bed;
   a rotary drum rotatably mounted on said frame for rotation about a horizontal axis;
   a plurality of tool change arms swingably mounted on said rotary drum for swinging movement relative to said drum between a storage position in said drum and a transfer position adjacent to said spindle;
   means on the outer end of each tool change arm for receiving a tool and for clamping said tool thereto;
   means for rotatably indexing said rotary drum to place a predetermined one of said tool change arms and its associated tool in a ready position at the bottom of said rotary drum for swinging the tool upwardly into engagement with said spindle; and
   means for swinging said tool change arm in the ready position from its storage position to its transfer position and from its transfer position to its storage position to transfer a tool from storage to said spindle and return a used tool from said spindle back to storage.

2. The tool changer according to claim 1 wherein said means for rotatably indexing said rotary drum includes:
   a rack mounted on said frame for reciprocating movement between and extended and a retracted position;
   a pinion engaged with said rack;
   means including an overrunning clutch coupling said pinion to said rotary drum for rotating said drum in response to rotation of said pinion gear in one direction but not in the other direction; and
   a pneumatic cylinder coupled to said rack for alternately extending and retracting said rack to rotatably index said rotary drum through predetermined angular increments.

3. The tool changer according to claim 1 wherein said means for swinging said tool change arm from its storage position to its transfer position includes:
- a rack mounted on said frame for reciprocating movement between and extended and a retracted position;
- a pinion engaged with said rack;
- means coupling said pinion to said tool change arm for rotating said arm in response to rotation of said pinion; and
- a pneumatic cylinder coupled to said rack for alternately extending and retracting said rack to swing said tool change arm between its storage position and its transfer position.

4. The tool changer according to claim 1 wherein said means on the outer end of each tool change arm for clamping said tool thereto comprises:
- a fork in the outer end of each tool change arm; and
- a U-shaped clamp in each fork.

5. The tool changer according to claim 1 wherein said means for rotatably indexing said rotary drum includes:
- a pneumatic cylinder having a portion which is movable between an extended and retracted position; and
- means coupling said pneumatic cylinder to said rotary drum for rotating said drum in response to movement of said pneumatic cylinder in one direction but not in the other direction.

6. The tool changer according to claim 5 wherein the last mentioned means includes an overrunning clutch.

7. The tool changer according to claim 1 wherein said means for swinging said tool change arm between its storage position and its transfer position includes:
- a pneumatic cylinder having a portion which is movable between an extended and a retracted position; and
- means coupling said pneumatic cylinder to said tool change arm for swinging said arm between its storage position and transfer position in response to movement of the movable portion of said pneumatic cylinder.

8. The tool changer according to claim 1 wherein said means for rotatably indexing said rotary drum comprises means for rotating said drum through an arc corresponding to the angular space separating adjacent tool changer arms.

9. The tool changer according to claim 8 wherein said means for rotating said rotary drum includes:
- a pneumatic cylinder having an extendible and retractable piston; and
- means for rotating said rotary drum through said arc corresponding to the angular space separating adjacent tool change arm in response to one movement of said piston.

10. The tool changer according to claim 1 and further comprising:
- a plurality of index holes in said rotary drum; and
- an index pin positioned to enter any selected one of said index holes to latch said drum in a predetermined angular position.

11. The tool changer according to claim 10 wherein said index holes are arranged in a circle concentric with said rotary drum, each adjacent pair of index holes being spaced apart by the angular distance that separates adjacent tool change arms.

12. The tool changer according to claim 10 and further comprising a pneumatic cylinder attached to said index pin for moving said pin into and out of said index hole.

13. A tool changer for automatically changing the tools in the rotary spindle of a machine tool which includes a stationary bed and a frame rigidly attached to said bed comprising:
- a rotary drum storing a plurality of tools for use in said rotary spindle, said rotary drum being rotatably mounted on said frame for rotation about a horizontal axis;
- a ready station at the bottom of said rotary drum for receiving one of said tools in position to be transferred to said rotary spindle and for receiving a previously used tool from said rotary spindle for return to said drum;
- means for indexing said drum to locate a selected tool at said ready station;
- a separate tool change arm for each of said tools carried by said drum for rotation therewith; and
- each of said tool change arms being adapted to swing upwardly to transfer its associated tool between said ready station and said rotary spindle.

* * * * *